US008827736B2

(12) United States Patent
Wischerath et al.

(10) Patent No.: US 8,827,736 B2
(45) Date of Patent: Sep. 9, 2014

(54) CURRENT DISTRIBUTION DEVICE FOR A HIGH-VOLTAGE NETWORK AND MOTOR VEHICLE

(75) Inventors: Jan Wischerath, Ingolstadt (DE); Christoph Blösch, Bubenreuth (DE); Christian Wirthmüller, Engelthal (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/883,420

(22) PCT Filed: Sep. 8, 2011

(86) PCT No.: PCT/EP2011/004523
§ 371 (c)(1),
(2), (4) Date: Jul. 23, 2013

(87) PCT Pub. No.: WO2012/059153
PCT Pub. Date: May 10, 2012

(65) Prior Publication Data
US 2014/0179150 A1   Jun. 26, 2014

(30) Foreign Application Priority Data
Nov. 3, 2010   (DE) .......................... 10 2010 050 124

(51) Int. Cl.
*H01R 13/625* (2006.01)
*H01R 13/629* (2006.01)
*H01R 13/639* (2006.01)

(52) U.S. Cl.
CPC ............ *H01R 13/639* (2013.01); *H01R 13/629* (2013.01)
USPC ........................................................ 439/347

(58) Field of Classification Search
USPC .......................................................... 439/347
See application file for complete search history.

(56) References Cited

U.S. PATENT DOCUMENTS

| | | | |
|---|---|---|---|
| 4,767,347 A | | 8/1988 | Kamp et al. |
| 5,919,053 A | * | 7/1999 | Tsuji et al. ..................... 439/157 |
| 6,183,279 B1 | * | 2/2001 | Murakami et al. ............ 439/157 |
| 6,413,104 B1 | | 7/2002 | Bernardini |
| 6,700,083 B2 | * | 3/2004 | Konda ........................ 200/51.09 |
| 7,785,127 B2 | * | 8/2010 | Nagamine ..................... 439/347 |
| 8,632,353 B2 | * | 1/2014 | Rassoolkhani et al. ........ 439/358 |
| 2004/0077205 A1 | * | 4/2004 | Holmes et al. ................. 439/347 |
| 2005/0221629 A1 | | 10/2005 | Woellner et al. |
| 2008/0076289 A1 | * | 3/2008 | Hsu Huang et al. .......... 439/347 |
| 2014/0117783 A1 | * | 5/2014 | Rassoolkhani et al. .... 307/141.4 |

FOREIGN PATENT DOCUMENTS

DE       601 15 733 T2    8/2006
DE   10 2008 049 999 A1   4/2010

OTHER PUBLICATIONS

International Search Report issued by the European Patent Office in International Application PCT/EP2011/004523 on Dec. 14, 2011.

* cited by examiner

*Primary Examiner* — Ross Gushi
(74) *Attorney, Agent, or Firm* — Henry M Feiereisen LLC

(57) ABSTRACT

A current distribution device for a high-voltage network, in particular in a motor vehicle, includes at least two first connections that can be locked in such a way that, after a locking device is closed, a connector plugged into the connection can no longer be removed, wherein the first connections have a first locking plate as a common locking device.

16 Claims, 4 Drawing Sheets

CURRENT DISTRIBUTION DEVICE FOR A HIGH-VOLTAGE NETWORK AND MOTOR VEHICLE

CROSS-REFERENCES TO RELATED APPLICATIONS

This application is the U.S. National Stage of International Application No. PCT/EP2011/004523, filed Sep. 8, 2011, which designated the United States and has been published as International Publication No. WO 2012/059153 and which claims the priority of German Patent Application, Serial No. 10 2010 050 124.7, filed Nov. 3, 2010, pursuant to 35 U.S.C. 119(a)-(d).

BACKGROUND OF THE INVENTION

The invention relates to a current distribution device for a high-voltage network, in particular in a motor vehicle, having at least two first connections which can be interlocked so that after a locking device is closed, a connector plugged into the connection can no longer be removed.

In high-voltage systems, for example in motor vehicles, especially in hybrid vehicles, it is known to protect connectors that are plugged into current distribution device from being accidental unplugged and/or slipping out. In this way, the safety of the current distribution device is to be increased. For this purpose, locking devices are known in which, for example, a projection formed on a metal sheet engages in a groove on the connector (frequently referred to as a sleeve). The connector having such a typically annular groove is thus fully inserted into the connection, so that the groove is located at a certain height. The locking device with the projection engaging in the groove is then moved, for example, on a surface supporting the connection until the projection engages in the groove and thus protects the connector from being accidentally pulled out and/or slipping out.

Current distribution devices for high-voltage systems usually include a plurality of such connections, for example six such connections for one motor vehicle. However, it is very cumbersome to operate the locking device associated with this connection after each insertion of a connector, making the assembly during each connection of the high-voltage contacts time-consuming and labor-intensive. Even when the connections are implemented as screw connections, the system is rather complex because each connector must be successively screwed into the connection.

SUMMARY OF THE INVENTION

It is therefore an object of the invention to provide a current distribution device for a high-voltage network, which enables a less time-consuming assembly and potentially enhances safety.

This object is attained with a current distribution device according to the invention of the aforementioned type in that the first connections have a first locking plate forming a common locking device.

According to the invention, a large-area locking plate is used which when moved engages simultaneously in all the grooves of the connectors plugged into the first connections. It is thus sufficient to initially insert all the first contacts and to then interlock the connectors in the first connections in a single operation by displacing the locking plate. The locking plate thus interlocks simultaneously a plurality of high-voltage contacts, preventing them from slipping out. This allows a quicker assembly because a locking device does not need to be separately operated for each first connection.

Specifically, the first locking plate may be displaceable between an open position and a closed position and is configured in the closed position for engagement in a locking recess, in particular a groove, of a connector inserted in a first connection. It should be noted here that, aside from a circumferential groove on the connector, other locking recesses are also feasible, for example directional locking recesses or grooves, if the connector must be plugged in a certain direction. A control element may be provided for moving the locking plate between the two positions, for example a pin and the like, to provide a good grip and for movement between the positions.

According to a particular advantageous embodiment, the first locking plate may be held in the positions with an elastic bias. This means that an elastic means is provided, which clearly defines the open position and the closed position; in other words, there are two well-defined nominal positions, namely the open position and the closed position. This provides a kind of locking mechanism which not only pre-defines the positions, but also provides protection against accidental slippage and/or displacement of the locking plate, which could cause unlocking.

Specifically, at least one groove extending in the displacement direction and having a center step may be provided in the connection-side surface of the current distribution device, wherein the first locking plate which covers the groove is supported by a spring which is biased when crossing the step outside the positions. The elastic means is in this case a spring, particularly a leaf spring, which is fastened to the locking plate such that the spring is located in the open position and the closed position in the intended region of the groove without a step, in particular in the relaxed state. When the locking plate is displaced, the spring slides on the step and is thus biased, meaning that a resistance must be overcome until the spring finally relaxes on the other side of the step when reaching the other position. Clearly defined positions can thus be realized in a simple manner.

Advantageously, the locking plate may have at least one guide aperture, with which a guide pin which is located on the connection-side surface engages for guiding the first locking plate. The travel of the first locking plate is then clearly defined by a simple guiding device, enabling secure interlocking. When an embodiment is selected where the locking plate is to be guided, for example, under spring bias across a central step in a groove in the surface, the pin may be thickened on the side distal from the surface, which prevents the first locking plate from being lifted, which is thus guided horizontally. Typically, linear travel between the closed position and the open position is desired. It should be noted that, optionally in addition, other guide means may be provided.

In another embodiment of the present invention, at least one second connection may be provided, in particular a pilot line connection, which has its own second locking plate. The high-voltage contact on the second connection is thus part of the pilot line monitoring of the high-voltage network, in particular in the motor vehicle. When high-voltage is not present at the second connection at the high-voltage connection and/or when the connector is removed from the second connection, this is monitored by a controller and the entire high-voltage system is de-energized.

According to a particularly advantageous feature of the present invention, by providing a separate second locking plate on the second connection, it may not be possible to open the second locking plate when a connector is inserted into the second connection and/or the second locking plate is closed.

The fact that a contact is established on the second connection, meaning that the pilot line monitoring keeps the high-voltage network at a high voltage, prevents the first locking plate from being moved into the open position, so that work on the first connections can only be performed when the contacts of the second connection have not received a connector, and the high-voltage network is therefore de-energized. This further improves the safety because, on one hand, the pilot line connection must be inserted last and, on the other hand, the connectors can only be pulled out of the first connections when the pilot line connection was previously disconnected. For this reason, it is advantageous to link the possibility for opening the first locking plate to the presence of a connector in the second connection. The remaining high voltage contacts on the first connections can then only be removed by first removing the voltage. This measure significantly enhances safety.

Specifically, the inserted connector in the second connection and/or the second locking plate may mechanically block the closed first locking plate, i.e., the closed first locking plate already abuts the closed second locking plate or, preferably, the inserted connector in the second connection so that the first locking plate can no longer be displaced and thus opened. The first locking plate can be mechanically displaced for opening only when the connector inserted in the second connection is removed and/or the second locking plate is moved to an open position It should also be noted here that, when the connector inserted into the second connection is mechanically blocked and the extension of the first locking plate would preclude displacement into an open state due to the second locking plate, the first locking plate may be raised in the region of the second connection and of the second locking plate, so that it can be pushed over the second locking plate without causing mechanical blocking. However, it should also be noted that raising the first locking plate in the region of the second connection may already be beneficial, so that the first locking plate cannot be moved through engagement in a circumferential groove of a connector inserted into the second connection, wherein for example the second locking plate engages in this groove or another latching receptacle.

The current distribution device according to the invention may advantageously be used in a motor vehicle. It may therefore be constructed as an adapter plate to be attached to power electronics of a motor vehicle and may include bus bars to be inserted into corresponding connections of the power electronics. For example, when power electronics is arranged in a housing in the motor vehicle, an embodiment is conceivable, wherein the power electronics includes a connection system capable of mechanically supporting the adapter plate and at the same time contacting the bus bars of the adapter plate, so that the adapter plate abuts the housing of the power electronics and provides the first connections and optionally the at least one second connection. It will be understood that additional mechanical mounting means may also be used.

Specifically, five first connections maybe provided for an electric machine and/or a high-voltage battery of the motor vehicle and/or a second connection adjacent to the pilot line may include connections for an additional high-voltage device, in particular an air conditioning compressor. In a hybrid vehicle, a high-voltage network with a high-voltage battery is typically provided for operating an electric traction machine which can be used both as a motor and as a generator when operating an also installed internal combustion engine. Thus, five first connections may be provided, wherein two of these connections may be associated with the high-voltage battery and three other connections with the electric machine.

The second connector may, in addition to the pilot line function, also have a current-carrying function, for example, by closing four individual contacts, wherein two of the contacts are associated with the pilot line and another two contacts are associated with another high-current load, in particular an air conditioning compressor.

In addition to the current distribution device, the present invention also relates to a motor vehicle, particularly a hybrid vehicle, which includes a high-voltage network with a current distribution device according to the invention. All statements relating to the current distribution device can be applied analogously to the vehicle according to the invention, thus allowing the benefits described therein to be achieved. In particular, an embodiment of the current distribution device in the form of an adapter plate to be attached to power electronics of the motor vehicle is advantageous, as described above. In particular, in an embodiment with a second pilot line connection that can be separately interlocked, wherein the first locking plate can be opened only when a connector is not present on the pilot line connection, the present invention not only improves handling and reduces the time needed for installation, but also increases the safety in the motor vehicle according to the invention.

It should be noted here that it is frequently necessary especially in motor vehicles, to be able to visually inspect the assembly state and in particular the state of locking devices of a current distribution device. Therefore, an opening or aperture may also be provided in the second locking plate of the current distribution device through which information provided on a surface of the current distribution device may be viewed when the second locking plate is in the closed position. Such information may, for example, be a point having a specific color, for example a signal color, such as yellow; however, other configurations are conceivable. Alternatively, partial information may be provided on the second locking plate as well as on a surface of the current distribution device, with the partial information complementing each other to form a total information in the closed position of the second locking plate. For example, a colored line may be used which is continuous in the closed position of the second locking plate.

It should also be noted at this point that in other applications, for example when only be first locking plate is provided, an optical marker of this type may also be provided for the first locking plate; in addition, such optical markers may be provided for both the first and the second locking plate.

BRIEF DESCRIPTION OF THE DRAWING

Further advantages and details of the present invention will become apparent from the exemplary embodiments hereinafter described and from the drawings, which show in.

DETAILED DESCRIPTION OF PREFERRED EMBODIMENTS

Figure 1:
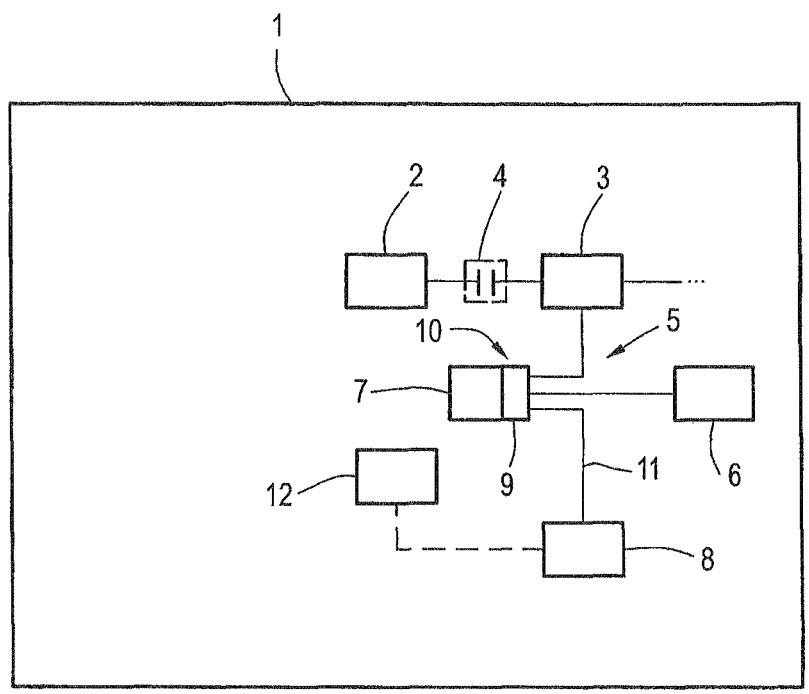
FIG. 1 a motor vehicle according to the invention.

FIG. 1 shows an motor vehicle 1 according to the present invention, here a hybrid vehicle. It is composed of an electric traction machine 3 in addition to a conventional internal combustion engine 2, wherein the two driving machines can be connected via a separating clutch 4. The electric machine 3 can also be operated in generator mode.

The electric motor 3 is supplied from a high-voltage network 5 having a high voltage battery 6, wherein part of the high-voltage network 5 is formed of an air conditioning compressor 8 in addition to power electronics 7.

A current distribution device 10 according to the present invention realized as an adapter plate 9 is attached to the power electronics 7, wherein the current distribution device 10 has connections for the electric machine 3, the high-voltage battery 6 and the air conditioning compressor 8. The line 11 to the air conditioning compressor 8 also carries pilot line signals, which are monitored by a control device 12. When high voltage is not present on line 11, the entire high-voltage system 5 is de-energized.

Figure 2:
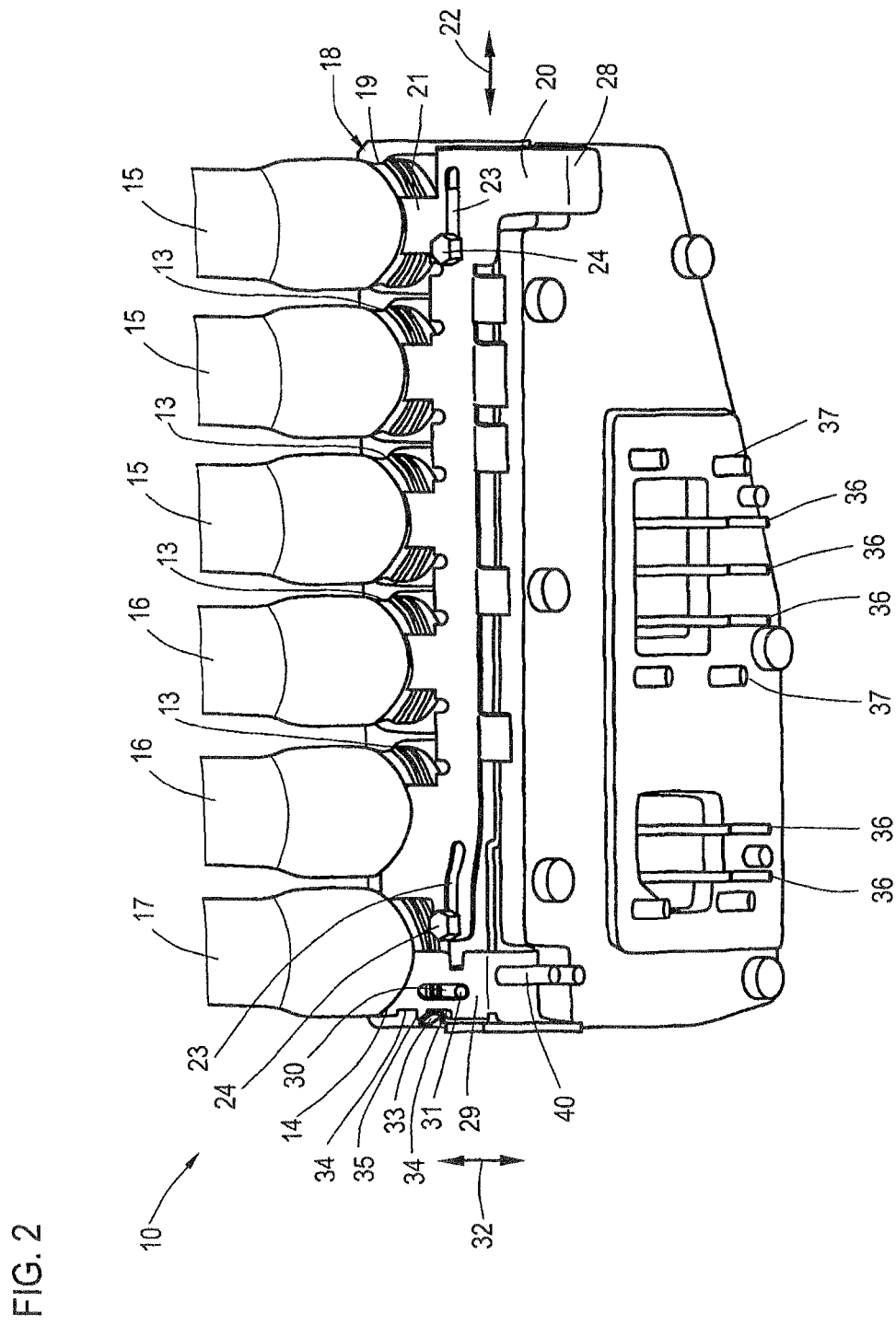
FIG. 2 a perspective view of a current distribution device according to the present invention, FIG. 3 a sectional view through the current distribution system according to the present invention.
Figure 3:
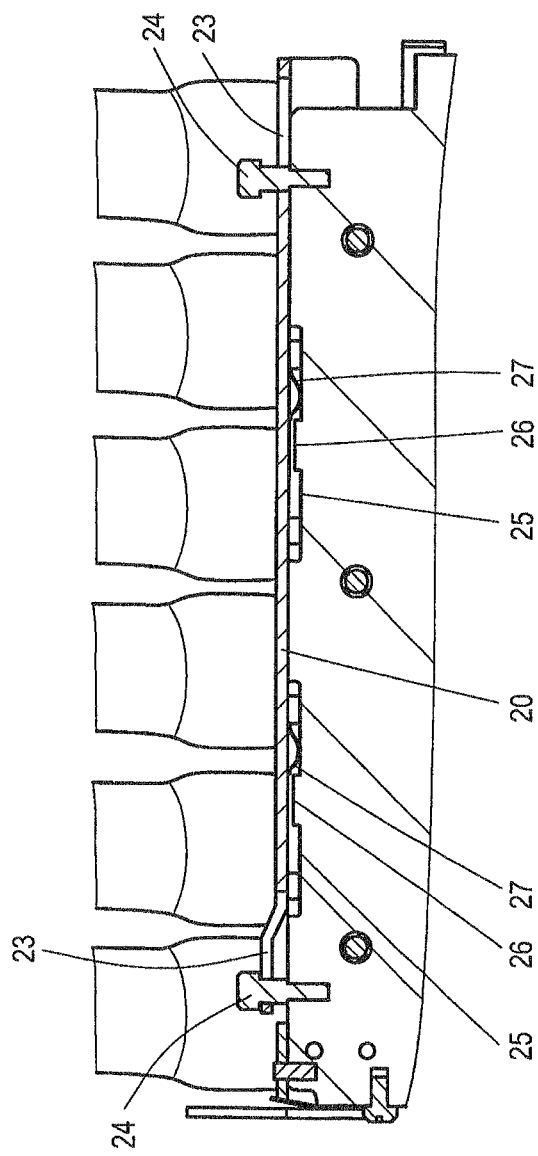

FIGS. 2 and 3 show the current distribution device 10 in more detail. The current distribution device 10 has first connections 13 and a second connection 14 disposed on a top surface 5. Connectors 15, 16, 17 are here shown in all connections, wherein the connector 15 is associated with the electric machine 3, the connectors 16 are associated with the high voltage battery 6 and the connector 17, which includes the pilot lines, is associated with the air conditioning compressor 8. All connectors 15-17 have a circumferential groove 19 forming a locking receptacle 18 which is located at a certain height when the connectors 15-17 are inserted.

The groove 19 serves to lock the connectors 15-17, to prevent them from being accidentally pulled out or from slipping out. To realize a corresponding locking device, a first locking plate 20 common for all connections 13 is provided, with locking projections 21 which engage in the closed position of the first locking plate 20 in the groove 19, as shown in FIG. 2.

The first locking plate 20 has a clearly defined open position and a clearly defined closed position, and is held in both positions with an elastic bias. The first locking plate 20 can be switched between the positions by moving along the arrow 22. As can be seen, the first locking plate 2 has guide openings 23, with a corresponding guide pin 24 disposed on the connection-side surface of the current distribution device 10 engaging with a corresponding guide opening 23.

At the same time, grooves 25 with a center step 26 are provided in the connection-side surface below the first locking plate 20, in which a spring 27 attached to the first locking plate 20 engages, which spring 27 does not come to rest on the step 26 in the open and closed position and is therefore relaxed. When the first locking plate 20 is to be displaced, the spring 27 must be pushed onto the step 26 and is thereby tensioned, so that an elastic counter-force must be overcome, which clearly defines, on one hand, the open and closed position and, on the other hand, prevents the first locking plate 20 from accidentally slipping. To prevent a change in height of the first locking plate 20, the guide pins 24 have in their respective upper portion a thickened portion which also horizontally guides the locking plate 20.

An operating element 28 allows easy gripping of the first locking plate 20, and thus simple displacement.

A dedicated locking device in the form of a second locking plate 29 is associated with the second connection 14; the second locking plate 29 also has a guide opening 30 with which a guide pin 31 engages. The second locking plate 29 is thus displaceable between an open and a closed position along the arrow 32, wherein the closed position is illustrated in FIG. 2. In order to clearly define the open position and the closed position also in the second locking plate 29 and to generate an elastic counter-torque, which holds the second locking plate 29 in the current position, a spring 33 is attached to the current distribution device 10, which cooperates with the profiled surface of the second locking plate 29, which has two depressions 35 separated by a step 34 defining the two positions. This can be clearly seen in FIG. 4 and FIG. 5.

The second locking plate 29 also includes a control element 40 for easier operation.

The first locking plate 20 is shaped so that it abuts in its closed position the connector 17 inserted in the second connection 14, as shown in FIG. 2, and is mechanically blocked by this connector 17. The first locking plate 20 can then only be opened when no connector 17 is inserted into the second connection 14.

It should be noted here that the first locking plate 20, as can be seen from FIG. 2, is raised in the area of the second connection 14 so that it is prevented from engaging in the groove 19 of the connector 17, but can on the other hand be displaced across the second locking plate 29 for opening.

Consequently, the first connections 13 must first be inserted before the second connection 14 can be inserted, and the connectors 15, 16 cannot be removed without beforehand removing the connector 17 in the second connection 14 representing a pilot line connection. This will contribute to the overall safety. The pilot line connection 14 must always be inserted last, but must be disconnected first, so that the high-voltage network 5 is de-energized when the first connections 13 are inserted.

As already explained with reference to FIG. 1, the current distribution device 10 according to FIGS. 2 and 3 is implemented as an adapter plate 9 which can be arranged on a power electronics 7. Accordingly, the current distribution device 10 includes bus bars 36 and mechanical connectors 37, with which the adapter plate 9 may be secured and connected to the power electronics 7.

Especially with motor vehicles, a technician must have an easy way to visually check whether the second locking plate 29 is closed. For this reason, an optical marker is provided in the present exemplary embodiment, which will be described in more detail with reference to FIGS. 4 and 5.

Figure 4:
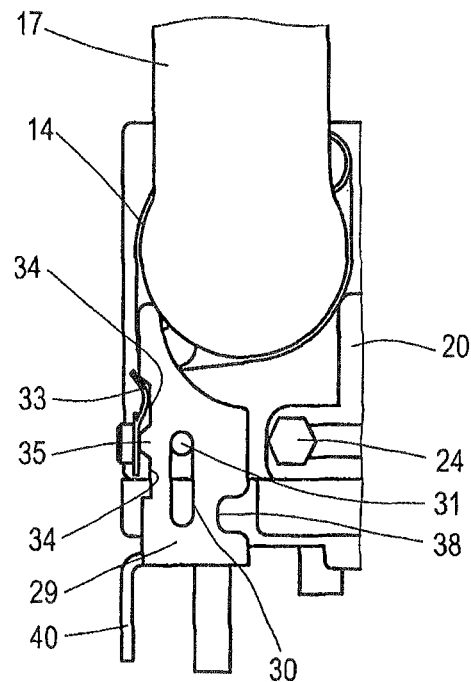
FIG. 4 is a partial view of the current distribution device with an open second locking plate.
Figure 5:
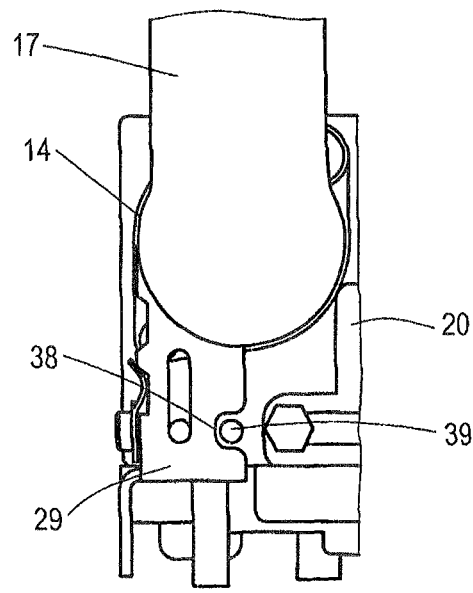
FIG. 5 is a partial view of the current distribution device with a closed second locking plate.

FIG. 4 shows the second locking plate 29 in an open position. As can be seen, the second locking plate 29 has a recess 38. When the second locking plate 29 is then closed, as illustrated in FIG. 5 showing the closed state, the recess 38 is located above clearly identifiable optical information or a marker 39, which is realized here as a yellow dot.

FIGS. 4 and 5 also show again clearly how the first locking plate 20 abuts the connector 17 and is mechanically blocked by the connector 17.

It should be noted here again that there are, of course, other possibilities of visually indicating clearly to the technician whether a locking plate 20, 29 is open or closed, for example via a green line and the like that can be matched to other optical information.

What is claimed is:

1. A current distribution device for a high-voltage network, comprising:
 a first locking plate movable in a displacement direction between an open position and a closed position, wherein the first locking plate is held in the open position and in the closed position with an elastic bias, said first locking plate forming a common locking device for at least two interlockable first connections, said common locking device—when closed—preventing removal of a connector inserted into the at least two first connections,
 wherein the first locking plate is configured in the closed position for engagement in a locking recess of the connector, and wherein the first locking plate comprises at least one groove extending in the displacement direction and having a center step in a surface facing the at least two first connections, wherein the first locking plate is supported by a spring which is tensioned when moving across the center step.

2. The current distribution device of claim 1, wherein the current distribution device is installed in a motor vehicle.

3. The current distribution device of claim 1, wherein locking recess of the connector comprises a groove.

4. The current distribution device of claim 1, further comprising a guide pin arranged on the surface facing the at least two first connections for guiding the first locking plate, wherein the locking plate comprises at least one guide opening through which the guide pin passes.

5. The current distribution device of claim 1, further comprising at least one second connection and a separate second locking plate cooperating with the at least one second connection.

6. The current distribution device of claim 5, wherein the at least one second connection comprises a pilot line connection.

7. The current distribution device of claim 6, wherein the at least one second connection comprises, in addition to the pilot line, contacts for an additional high-voltage device.

8. The current distribution device of claim 7, wherein the additional high-voltage device is an air conditioning compressor.

9. The current distribution device of claim 5, wherein a connector inserted in the at least one second connection prevents the first locking plate from being moved from the closed position to the open position.

10. The current distribution device of claim 9, wherein inserted connector mechanically blocks the closed first locking plate.

11. The current distribution device of claim 5, wherein the first locking plate cannot be moved from the closed position to the open position when the second locking plate is closed.

12. The current distribution device of claim 11, wherein the closed second locking plate mechanically blocks movement of the closed first locking plate.

13. The current distribution device of claim 1, wherein the current distribution device is constructed as an adapter plate for a motor vehicle for attachment to a power electronics and comprises bus bars configured for insertion in corresponding connections of the power electronics.

14. The current distribution device of claim 13, wherein the at least two interlockable first connections comprise five first connections configured for connecting an electric machine or a high-voltage battery of the motor vehicle, or both.

15. A motor vehicle, comprising a high-voltage network with a current distribution device, wherein the current distribution device comprises:
   a first locking plate movable in a displacement direction between an open position and a closed position, wherein the first locking plate is held in the open position and in the closed position with an elastic bias, said first locking plate forming a common locking device for at least two interlockable first connections, said common locking device—when closed—preventing removal of a connector inserted into the at least two first connections,
   wherein the first locking plate is configured in the closed position for engagement in a locking recess of the connector, and wherein the first locking plate comprises at least one groove extending in the displacement direction and having a center step in a surface facing the at least two first connections, wherein the first locking plate is supported by a spring which is tensioned when moving across the center step.

16. The motor vehicle of claim 15, wherein the motor vehicle is a hybrid motor vehicle.

* * * * *